(12) United States Patent
Honeyman et al.

(10) Patent No.: US 7,952,790 B2
(45) Date of Patent: May 31, 2011

(54) ELECTRO-OPTIC MEDIA PRODUCED USING INK JET PRINTING

(75) Inventors: Charles Howie Honeyman, Roslindale, MA (US); Guy M. Danner, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 787 days.

(21) Appl. No.: 11/689,164

(22) Filed: Mar. 21, 2007

(65) Prior Publication Data

US 2007/0223079 A1 Sep. 27, 2007

Related U.S. Application Data

(60) Provisional application No. 60/743,653, filed on Mar. 22, 2006.

(51) Int. Cl.
*G02B 26/00* (2006.01)
(52) U.S. Cl. .......................... 359/296; 345/107
(58) Field of Classification Search ................ 359/296; 345/107
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 5,745,094 A | 4/1998 | Gordon, II et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 5,920,378 A | 7/1999 | Murakami et al. |
| 5,930,026 A | 7/1999 | Jacobson et al. |
| 5,961,804 A | 10/1999 | Jacobson et al. |
| 5,975,680 A | 11/1999 | Wen et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |

(Continued)

FOREIGN PATENT DOCUMENTS

EP 1 099 207 B1 3/2002

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Ricky L Mack
*Assistant Examiner* — James C Jones
(74) *Attorney, Agent, or Firm* — David J. Cole

(57) ABSTRACT

Ink jet printing can be used in the production of electro-optic displays for (a) forming a layer of a polymer-dispersed electrophoretic medium on a substrate; (b) forming a color electro-optic layer; (c) forming a color filter; and (d) printing electrodes and/or associated conductors on a layer of electro-optic material.

11 Claims, 6 Drawing Sheets

U.S. PATENT DOCUMENTS

| | | |
|---|---|---|
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,525,865 B2 | 2/2003 | Katase |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,583,780 B1 | 6/2003 | Kawai |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,717,716 B2 | 4/2004 | Kawai |
| 6,721,083 B2 | 4/2004 | Jacobson et al. |
| 6,724,519 B1 | 4/2004 | Morrison et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |

| | | |
|---|---|---|
| 7,453,445 B2 | 11/2008 | Amundson |
| 7,492,339 B2 | 2/2009 | Amundson |
| 7,513,813 B2 | 4/2009 | Paolini, Jr. et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,554,712 B2 | 6/2009 | Patry et al. |
| 7,561,324 B2 | 7/2009 | Duthaler et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0181071 A1 | 12/2002 | Kawai et al. |
| 2003/0102858 A1 | 6/2003 | Jacobson et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0180476 A1 | 9/2004 | Kazlas et al. |
| 2004/0190114 A1 | 9/2004 | Jacobson et al. |
| 2004/0246413 A1 | 12/2004 | Stephenson et al. |
| 2004/0263947 A1 | 12/2004 | Drzaic et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0195488 A1 | 9/2005 | McCabe et al. |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2007/0013683 A1 | 1/2007 | Zhou et al. |
| 2007/0035532 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2008/0043318 A1* | 2/2008 | Whitesides et al. .......... 359/296 |
| 2008/0074730 A1 | 3/2008 | Cao et al. |

FOREIGN PATENT DOCUMENTS

| | | |
|---|---|---|
| EP | 1 145 072 B1 | 5/2003 |
| JP | 2001-235771 | 8/2001 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1 SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC MEDIA PRODUCED USING INK JET PRINTING

REFERENCE TO RELATED APPLICATIONS

This application claims benefit of Provisional Application Ser. No. 60/743,653, filed Mar. 22, 2006.

This application is related to:

(a) U.S. Pat. No. 6,982,178;

(b) application Ser. No. 10/605,024 filed Sep. 2, 2003 (Publication No. 2004/0155857, now U.S. Pat. No. 7,561,324); and (c) U.S. Pat. No. 7,110,164, issued Sep. 19, 2006 on application Ser. No. 10/904,063, filed Oct. 21, 2004, which claims priority from Application Ser. No. 60/481,553, filed Oct. 24, 2003; Application Ser. No. 60/481,554, filed Oct. 24, 2003; Application Ser. No. 60/481,557, filed Oct. 23, 2003; Application Ser. No. 60/481,564, filed Oct. 27, 2003; and Application Ser. No. 60/520,226, filed Nov. 14, 2003.

The entire contents of all the aforementioned applications, and of all other United States Patents and published and copending Applications mentioned below, are also herein incorporated by reference.

BACKGROUND OF INVENTION

The present invention relates to electro-optic media produced using ink jet printing. This invention is especially, but not exclusively, intended for use in the production of color electro-optic media.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; and 7,180,649; and U.S. Patent Applications Publication Nos. 2002/0060321; 2002/0090980; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication No. 2004/0226820); and other similar techniques.) Thus, the resulting display can be flexible. Further, because the display medium can be printed (using a variety of methods), the display itself can be made inexpensively.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0155857 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

Copending application Ser. No. 11/550,114 (Publication No. 2007/0109219) describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

Ink jet printing has certain features which render it especially useful in the production of electrophoretic media and displays. Ink jet printing allows for the deposition of several different "inks" simultaneously in controlled patterns. Ink jet printing also allows for precise control of the amount of "ink" deposited in any specific area of the display. Accordingly, various processes for using ink jet printing in the production of electrophoretic media and displays have already been described. For example, International Application Publication No. WO 00/03291 and the corresponding U.S. Patent Publication No. 2004/0190114 teach a method of using ink jet deposition of capsules in registration with electrodes to make a full color display. U.S. Pat. No. 6,327,072 describes the use of ink jet printing to fill a microcell electrophoretic display, including ink jet printing of multiple electrophoretic media to form a full color display. U.S. Pat. No. 5,975,680 describes a method for producing a non-emissive display having a plurality of pixels on a substrate and the pixels being defined by intersecting electrodes, comprising: (a) providing a plurality of reservoirs containing fluids including field-driven solid-phase particles; (b) providing a print head located in a printing position having at least one nozzle connected to a reservoir; (c) positioning the intersecting electrodes and for producing a signal associated with the position of the substrate relative to the print head; (d) moving the substrate in a first direction to the printing position in response to the signal; (e) ejecting drops of fluids from the reservoirs in response to the signal onto the intersecting electrodes on the substrate; (f) providing relative movement in a second direction between the print head and the substrate for fluids to be transferred to subsequent intersecting electrodes; and (g) providing the field-driven solid-phase particles in the fluid transferred to the substrate which change optical density in response to an applied electric voltage between the associated intersecting electrodes to produce the desired optical density in the non-emissive display.

The present invention provides additional processes for the use of ink jet printing in the manufacture of electrophoretic and other electro-optic media and displays

SUMMARY OF THE INVENTION

In one aspect, this invention provides a process for forming upon a substrate a layer of a two phase electrophoretic medium comprising a continuous phase and a discontinuous phase, the discontinuous phase comprising a plurality of droplets, each of which comprises a fluid and at least one particle disposed within the fluid and capable of moving through the fluid upon application of an electric field to the electrophoretic medium, the continuous phase comprising a polymeric material, the process comprising ink jet printing the electrophoretic medium on to the substrate.

In such a process, the electrophoretic medium may be ink jet printed with its continuous phase in a fluid form, and after printing of the electrophoretic medium, the electrophoretic medium may be subjected to conditions effective to convert the continuous phase to a solid form, thereby forming a coherent layer of the electrophoretic medium on the substrate. For example, the continuous phase of the material which is ink jet printed may be an oligomer or low molecular weight polymer which requires additional polymerization, cross-linking or drying (a term which is used herein to include removal of solvents other than water) to convert it to a solid form which forms the final coherent layer of the electrophoretic medium on the substrate.

In one form of this process, the electrophoretic medium is applied to a backplane containing at least one pixel electrode. Typically in such a process, the substrate comprises at least first and second pixel electrodes and a first electrophoretic medium is ink jet printed on the first pixel electrode and a second electrophoretic medium, having at least one optical state different from all the optical states of the first electrophoretic medium, is ink jet printed on the second pixel electrode. It is necessary to control the deposition of the various electrophoretic media so as to align them with the pixel electrodes, but in some cases it may not be necessary to align a specific electrophoretic medium with a specific electrode or set of electrodes. For example, consider a backplane on which are deposited three different encapsulated electrophoretic media having respectively red/white, green/white and blue/white extreme optical states, with each of the three media being coated on every third column of pixels in a two-dimensional row/column array of pixels. Provided that the stripes of each medium are accurately aligned with the columns of pixels, it is not necessary that the same medium always be deposited on (say) column 100 of pixels; provided that the same medium is deposited on column 100, column 103, column 106 etc., the final assignment of column 100 to be a red, green or blue column can be handled by the drive electronics or software. The deposition of the various electrophoretic medium may be simultaneous or sequential. In a preferred form of the process, the first electrophoretic medium is ink jet printed on the first pixel electrode with its continuous phase in a fluid form, and then subjected to conditions effective to convert the continuous phase to a solid form, thereby forming a coherent layer of the first electrophoretic medium on the first pixel electrode, and thereafter the second electrophoretic medium is ink jet printed on the second pixel electrode. To assist in depositing the electrophoretic media in alignment with the electrodes, the substrate may be provided with at least one fiducial mark and the printing of the electrophoretic medium may be effected at least one predetermined location relative to the at least one fiducial mark. Alternatively, the substrate may be mounted at a predetermined location on a stage (for example, apertures on the substrate may be engaged with projections on the stage) and the printing of the electrophoretic medium be effected at least one predetermined location relative to the stage.

In another aspect, this invention provides a process for forming a front plane laminate having a color filter, which process comprises:

providing a light-transmissive, electrically-conductive layer;

ink jet printing a plurality of areas of colored material on to the light-transmissive, electrically-conductive layer, the plurality of areas including areas of at least two different colors;

applying a layer of an electro-optic material over the colored material;

applying a layer of a lamination adhesive over the layer of electro-optic material; and applying a release sheet over the layer of lamination adhesive.

The colored material which is ink jet printed may be a precursor to the final colored material; for example, the material printed may be polymerized, cross-linked, dried or otherwise treated to form the final colored material in the front plane laminate. Thus, the colored material may be ink jet printed in a fluid form and thereafter subjected to conditions effective to convert the fluid form to a solid form, thereby forming a coherent layer of the colored material on the light-transmissive, electrically conductive layer. The areas of colored material (which are intended to form a color filter and thereby provide a color electro-optic display) may be applied simultaneously or sequentially, i.e., the various different colors may all be applied at the same time or they may be applied one at a time, or, for example, two colors may be applied together and one applied at a later time. In particular, a first colored material may be ink jet printed in a fluid form, and thereafter subjected to conditions effective to convert the fluid form to a solid form, thereby forming a coherent layer of the first colored material, and thereafter a second colored material may be ink jet printed on the light-transmissive, electrically-conductive layer. Since the colored areas in the front plane laminate are intended to be aligned with multiple sets of electrodes on a backplane when the front plane laminate is used to form an electro-optic display, it may be convenient for the ink jet printing operation to print at least one fiducial mark on the light-transmissive, electrically-conductive layer at least one predetermined location relative to at least one area of colored material. These fiducial marks can be used to align the colored areas with the electrodes in a later stage of the process for forming an electro-optic display.

In another aspect, this invention provides a process for forming a color front plane laminate, which process comprises:

(a) providing a light-transmissive, electrically-conductive layer;

(b) ink jet printing a plurality of areas of electro-optic material on to the light-transmissive, electrically-conductive layer, the plurality of areas including areas of at least first and second types of electro-optic material, the second type of electro-optic material having at least one optical state different from all the optical states of the first type of electro-optic material;

(c) applying a layer of a lamination adhesive; and (d) applying a release sheet over the layer of lamination adhesive, wherein steps (b) and (c) can be formed in either order.

As noted above, in this process steps (b) and (c) can be formed in either order. When step (b) is performed before step (c), the plurality of areas of electro-optic material are ink jet printed on to the light-transmissive, electrically-conductive layer, and the lamination adhesive is applied to the plurality of areas of electro-optic material; this variant of the process produces a "classic" front plane laminate as described in the aforementioned U.S. Pat. No. 6,982,178. Alternatively, if step (c) is performed before step (b) so that the lamination adhesive is applied to the light-transmissive, electrically-conductive layer, and the plurality of areas of electro-optic material are ink jet printed on to the lamination adhesive, the process produces a so-called "inverted" front plane laminate as described in copending application Ser. No. 11/550,114, filed Oct. 17, 2006. In the latter variant of the process, after the plurality of areas of electro-optic material have been ink jet printed on to the lamination adhesive, a second layer of lamination adhesive may be applied to the plurality of areas of electro-optic material. In either variant of the process, as in other processes of the invention previously described, the electro-optic material may be ink jet printed in a fluid form, and thereafter subjected to conditions effective to convert the fluid form to a solid form, thereby forming a coherent layer of the electro-optic material on the light-transmissive, electrically-conductive layer. In particular, a first colored material may be ink jet printed in a fluid form, and thereafter subjected to conditions effective to convert the fluid form to a solid form, thereby forming a coherent layer of the first colored material, and thereafter a second colored material is ink jet printed. The process may further comprise ink jet printing at least one fiducial mark at least one predetermined location relative to at least one area of electro-optic material.

Processes similar to those described above can be used to produce color double release films as described in the aforementioned 2004/0155857. Accordingly, this invention provides a process for forming a color double release film, which process comprises:

(a) providing a first release sheet;

(b) applying a first layer of a lamination adhesive to the release sheet;

(c) ink jet printing a plurality of areas of colored material, the plurality of areas of colored material including areas of at least two different colors;

(d) forming a layer of electro-optic material; and (e) providing a second layer of a lamination adhesive and a second release sheet over the layer of electro-optic material, wherein steps (c) and (d) are performed in either order. Since a double release film is essentially symmetric, the printing of the colored, non-electro-optic material may precede or follow the deposition of the electro-optic material itself, although when the double release film is used to form an electro-optic display, it will normally be necessary to ensure that colored layers (color filter) lie between the electro-optic material and the viewing surface of the display if the electro-optic material is of a type which is reflective and essentially opaque.

In this process, step (e) may be effected by forming the second layer of lamination adhesive on the second release sheet and thereafter laminating the second layer of lamination adhesive and the second release sheet to the remaining layers of the double release film.

The processes described above can also be modified for use in "one-layer-at-a-time" assembly processes as described in the aforementioned U.S. Pat. No. 7,110,164 and copending application Ser. Nos. 11/307,297, filed Jan. 31, 2006, and Ser. No. 11/682,409, filed Mar. 6, 2007. Thus, this invention further provides a process for producing an electro-optic display, which process comprises:

(a) providing a first release sheet;

(b) applying a first layer of a lamination adhesive to the release sheet;

(c) ink jet printing a plurality of areas of electro-optic material on to the first layer of lamination adhesive, the plurality of areas including areas of at least first and second types of electro-optic material, the second type of electro-optic material having at least one optical state different from all the optical states of the first type of electro-optic material; and (d) providing a second layer of a lamination adhesive and a second release sheet over the layer of electro-optic material.

In this process, step (d) may be effected by forming the second layer of lamination adhesive on the second release sheet and thereafter laminating the second layer of lamination adhesive and the second release sheet to the remaining layers of the double release film.

This invention also provides another similar process for producing a laminate for use in the production of an electro-optic display, the process comprising:

(a) providing a first release sheet;

(b) ink jet printing a plurality of areas of colored material on to the first release sheet, the plurality of areas including areas of at least two different colors, thereby forming a first sub-assembly;

(c) providing a second release sheet;

(d) forming a layer of electro-optic material on the second release sheet, thereby forming a second sub-assembly; and (e) laminating the first and second sub-assemblies together with the areas of colored material in contact with the layer of electro-optic material to form the laminate.

This process may further comprise forming a layer of a lamination adhesive on a third release sheet, removing one of the first and second release sheets from the laminate produced in step (e), and contacting the layer of lamination adhesive with one of the plurality of areas of colored material and the layer of electro-optic material exposed by removal of the release sheet.

This invention also provides another similar process for producing a laminate for use in the production of an electro-optic display, the process comprising:

(a) providing a first release sheet;

(b) ink jet printing a plurality of areas of electro-optic material on to the first layer of lamination adhesive, the plurality of areas including areas of at least first and second types of electro-optic material, the second type of electro-optic material having at least one optical state different from all the optical states of the first type of electro-optic material, thereby forming a first sub-assembly;

(c) providing a second release sheet;

(d) forming a layer of a lamination adhesive on the second release sheet, thereby forming a second sub-assembly; and (e) laminating the first and second sub-assemblies together with the layer of lamination adhesive in contact with the plurality of areas of electro-optic material to form the laminate.

This process may further comprise forming a layer of a lamination adhesive on a third release sheet, removing the first release sheet from the laminate produced in step (e), and contacting the layer of lamination adhesive with the layer of electro-optic material exposed by removal of the first release sheet.

In all of these processes, additional layers can be further laminated as desired.

This invention also extends to processes in which electro-optic materials are applied to a backplane containing at least one pixel electrode. Conveniently, in such a process, first and second types of electro-optic materials (the second type of electro-optic material having at least one optical state different from all the optical states of the first type of electro-optic material) are deposited sequentially on the backplane. It is necessary to control the deposition of the various electro-optic materials so as to align them with the pixel electrodes, but in some cases it may not be necessary to align a specific electro-optic material with a specific set of electrodes. For example, consider a backplane on which are deposited three different encapsulated electrophoretic media having respectively red/white, green/white and blue/white extreme optical states, with each of the three media being coated on every third column of pixels in a two-dimensional row/column array of pixels. Provided that the stripes of each medium are accurately aligned with the columns of pixels, it is not necessary that the same medium always be deposited on (say) column 100 of pixels; provided that the same medium is deposited on column 100, column 103, column 106 etc., the final assignment of column 100 to be a red, green or blue column can be handled by the drive electronics or software.

As in some of the processes described above, in the process described in the preceding paragraph, the electro-optic material which is ink jet printed may be a precursor to the final material; for example, the material printed may be polymerized, cross-linked, dried or otherwise treated to form the final colored material in the front plane laminate. Specifically, when the electro-optic material comprises a plurality of droplets of an internal phase (itself comprising electrophoretic particles in a fluid) dispersed in a binder (whether a capsule wall is or is not present between each droplet and the binder), the material will normally be ink jet printed with the binder in a fluid form, and the binder will thereafter be treated by drying, cross-linking, polymerization etc. to render it into a solid form which binds the droplets into a mechanically coherent layer. In most cases, it may be convenient to deposit the first electro-optic material, effect the necessary treatment of the binder to form mechanically coherent stripes of the first electro-optic material on the backplane, then deposit the second electro-optic material, and repeat this sequence until all the electro-optic materials have been deposited and treated.

It should be noted that, when depositing electro-optic material on a backplane, although it is necessary to deposit the material in registration with the pixels of the backplane, it may not be necessary to determine the positions of those pixels directly. In some cases, for example where polymeric electrodes are employed, such direct observation may be difficult. For example, it may be possible to provide the backplane with fiducial marks in known locations relative to the pixels and electrodes, and deposit the electro-optic material in registration with the fiducial marks. Alternatively, the backplane may be held at a known location relative to a stage or similar support and the position of the print head (or similar device) used to deposit the electro-optic material controlled relative to the stage. For example, a backplane could be provided with apertures at predetermined locations and these apertures engaged with projections on a stage, thus holding the backplane electrodes at known locations relative to the stage.

Another aspect of the present invention relates to ink jet printing of edge seals for electro-optic displays. As described, for example, in the aforementioned U.S. Pat. No. 6,982,178, it is often necessary to seal electro-optic materials from the environment; for example, many electro-optic materials are sensitive to moisture. Typically, the electro-optic material is sandwiched between a backplane and a front substrate; the latter provides mechanical support and protection for the front electrode of the display. Most of the sealing of the electro-optic material is provided by the backplane and the front substrate, but it is normally necessary to form an edge seal extending between the front substrate and the backplane to complete the sealing of the electro-optic material. Such an edge seal may be formed by injecting (for example, via a syringe) an edge sealing material into the gap between the front substrate and the backplane, and curing the edge sealing material, but ink jet printing may provide a convenient alternative.

Thus, this invention also provides a process for forming an electro-optic display, which process comprises:
  providing a front plane laminate comprising a front substrate, a light-transmissive electrically-conductive layer, and a layer of electro-optic material;
  providing a backplane comprising at least one pixel electrode; and
  laminating the front plane laminate to the backplane,
  wherein an adhesive material is ink jet printed on to a peripheral portion of at least one of the front substrate and the backplane prior to the lamination, the adhesive material forming an edge seal sealing the electro-optic material from the outside environment after the lamination.

This invention also provides another similar process for forming an electro-optic display, which process comprises:
  providing a backplane comprising at least one pixel electrode;
  ink jet printing an adhesive material on to a peripheral portion of the backplane;
  disposing on a central portion of the backplane lying within the adhesive material a front plane laminate comprising a front substrate, a light-transmissive electrically-conductive layer, and a layer of electro-optic material; and
  disposing at least one protective layer over the front plane laminate, the at least one protective layer extending beyond the periphery of the front plane laminate and contacting the adhesive material, thereby forming an edge seal around the front plane laminate.

The edge sealing material may of course be further treated after the edge seal has been formed; for example the edge sealing material may be treated with heat or radiation to effect any necessary curing of the edge sealing material. There are numerous possible ways of forming the edge seal. For example, as illustrated in FIG. 20 of the aforementioned U.S. Pat. No. 6,982,178, it may be desirable to provide one or more additional protective layers on the side of the front substrate remote from the backplane, and the edge seal may extend from the backplane to these protective layers rather than to the front substrate itself, so that the sequence of steps would be (a) ink jet print edge sealing material on peripheral portion of backplane; (b) laminate front plane laminate to backplane so that front plane laminate lies entirely within edge sealing material; and (c) place one or more protective layers on front substrate so that protective layers contact edge seal material, thereby forming an edge seal. The edge sealing material may of course be further treated after the placement of the protective layers, for example by heat or radiation to effect any necessary curing of the edge sealing material.

A further aspect of the invention relates to the ink jet printing of electrodes and/or conductors on to a layer of electro-optic material. Although as discussed above, in most cases it is common practice to form an electro-optic display by laminating a layer of electro-optic material to a backplane containing one or more electrodes, there are certain types of display where it may be advantageous to form the electrodes directly on to the electro-optic material. For example, it is known to use direct drive electro-optic displays (displays in which each pixel, which is typically of substantial size, is provided with a separate conductor which can be used to control the voltage applied to the pixel) as "animated" advertising signs in which the voltages on the pixels are controlled so that the sign cycles through a series of differing appearances. Each type of direct drive sign requires a different arrangement of pixels and hence of pixel electrodes, and if the pixel electrodes are produced in the conventional manner by etching a layer of metal on a backplane, each type of direct drive sign requires the preparation of at least one mask. Similarly, if the pixel electrodes are printed by conventional processes, for example using a printing roller, each type of direct drive sign requires the preparation of a new roller. The need for such masks or rollers increases the cost and the production lead time of direct drive signs. Ink jet printing of pixel electrodes and/or associated conductors directly on to a layer of electro-optic material avoids the need to prepare masks or printing rollers, and thus decreases costs and production lead time, since the ink jet printing can be directly controlled by a computer storing an image of the desired pattern of electrodes and/or conductors; in effect, the ink jet printing process uses a virtual, electronic mask rather than a physical one.

Thus, this invention provides a process for forming an electro-optic display, which process comprises forming a layer of an electro-optic material on a substrate, and ink jet printing at least one pixel electrode or conductor on to the electro-optic material on the substrate.

Figure 1A:
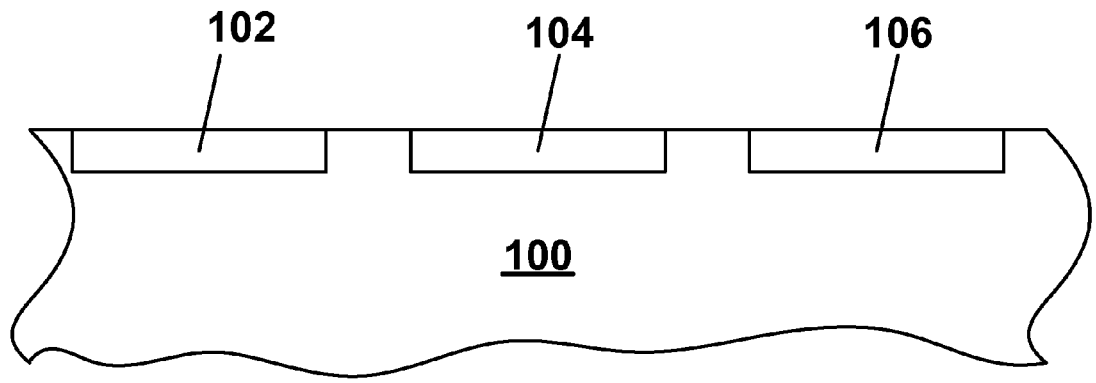
FIGS. 1A to 1E of the accompanying drawings are schematic side elevations showing various stages in the production of an active matrix electro-optic display of the present invention.

The accompanying drawings are intended to illustrate the principle of the present invention and are not strictly to scale. In particular, the thicknesses of the various layers in the illustrated structures are exaggerated relative to the lateral extent of these layers.

DETAILED DESCRIPTION

As already mentioned, the present invention provides numerous different processes in which ink jet printing is used in the production of electro-optic displays and components of such displays, especially front plane laminates and double release films. However, the numerous different processes of the invention all make use of one of the following four steps:
- (a) ink jet printing a layer of a polymer-dispersed electrophoretic medium on a substrate;
- (b) ink jet printing a plurality of different electro-optic media on a substrate to form a "color" electro-optic layer (in the sense of an electro-optic layer in which different areas react differently to application of an electric field);
- (c) ink jet printing a plurality of different colored materials on a substrate to produce a color filter (which is not necessarily a full color filter); and
- (d) ink jet printing electrodes and/or associated conductors on a layer of electro-optic material.

Various processes of the present invention will be discussed separately below, but it should be recognized that a single physical display may make use of more than one aspect of the present invention; for example, a single display might be produced by ink jet printing a plurality of different electro-optic media on a substrate, and subsequently ink jet printing electrodes and/or associated conductors on the electro-optic layer thus produced. In all cases, following the ink jet printing, it may be necessary or desirable to treat the printed material by drying, polymerization or cross-linking to convert the printed material to a coherent layer on the substrate. In the case of ink jet printing of "colored" materials intended to form a color filter, we do not exclude the possibility that the material as printed might be colorless, or have a color different from its final form, and that the material may need to be treated, for example by heating or by exposure to an acid or base, after printing in order to produce the final desired color in the printed material.

In all aspects of the present invention, in principle any known type of ink jet printing may be used. However, when printing electro-optic and especially electrophoretic media, typically it may be advantageous to use a mechanical (e.g., piezoelectric) ink jet print apparatus rather than a thermal apparatus, since exposure of droplets of electrophoretic fluid or exposure of capsules to a thermal print head may cause unwanted changes in the electrophoretic material, for example by causing conversion of the fluid to gas, or rupture of capsule walls.

As is well known to those skilled in ink jet printing, careful control of the viscosity of the medium being printed is typically necessary to achieve successful printing. The viscosities of binders used in electrophoretic materials are typically considerably higher that those of normal ink jet printing inks, and it may thus be desirable, when a process of the present invention requires printing of an electrophoretic medium, to lower the viscosity of the binder used, for example by addition of cosolvents which can be removed by evaporation after the electrophoretic material has been ink jet printed.

As already mentioned, one aspect of the present invention relates to a process for forming a layer of an electrophoretic medium upon a substrate by ink jet printing of the medium, wherein the medium is a polymer dispersed electrophoretic medium comprising a plurality of discrete droplets of an electrophoretic fluid and a continuous phase of a polymer binder, or a precursor of such a polymeric material. It is considered that, for purposes of ink jet printing, polymer dispersed electrophoretic media will generally have advantages over both unencapsulated electrophoretic media (in which a single phase is present and the electrophoretic particles are free to move through the electrophoretic medium) and conventional encapsulated electrophoretic media (the term "conventional encapsulated electrophoretic media" being used to refer to media in which a discrete capsule wall surrounds each droplet of electrophoretic fluid). In unencapsulated media, the electrophoretic particles may tend to separate from the surrounding fluid if the medium is left to stand for a substantial period, for example when the electrophoretic medium is stored for a period of several hours in the reservoir of an ink jet printer. The fluids used in electrophoretic media are typically volatile hydrocarbons, so there is a risk of a substantial amount of fluid evaporating from the printed droplets before the electrophoretic fluid is sealed in the final display. Finally, there is a risk of unencapsulated media spreading or smearing when the substrate on which the fluid has been applied is laminated to another part of the final display. Polymer dispersed electrophoretic media do not suffer from any of these disadvantages. Since the electrophoretic fluid is present as a series of discrete droplets, the particles do not leave the droplets in which they are originally confined. The continuous phase essentially prevents evaporation of the fluid and, since the continuous phase is formed into a polymeric layer before lamination of the electrophoretic medium, the continuous phase prevents spreading or smearing of the electrophoretic fluid. Conventional encapsulated electrophoretic media possess advantages similar to polymer dispersed media but, because of the differences in physical properties between the electrophoretic fluid and the capsule wall, in some cases there may be a risk of capsule wall rupture during ink jet printing of the electrophoretic material, with adverse effects upon the electro-optic performance of the final display. Such problems are less likely to occur with polymer-dispersed electrophoretic media, since an uncured polymer dispersed electrophoretic medium is essentially a fluid-in-fluid emulsion.

Figure 1B:
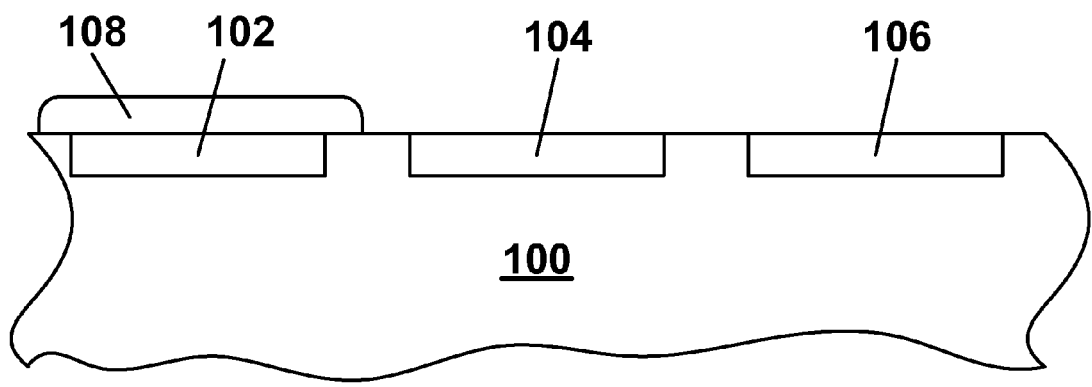
Figure 1C:
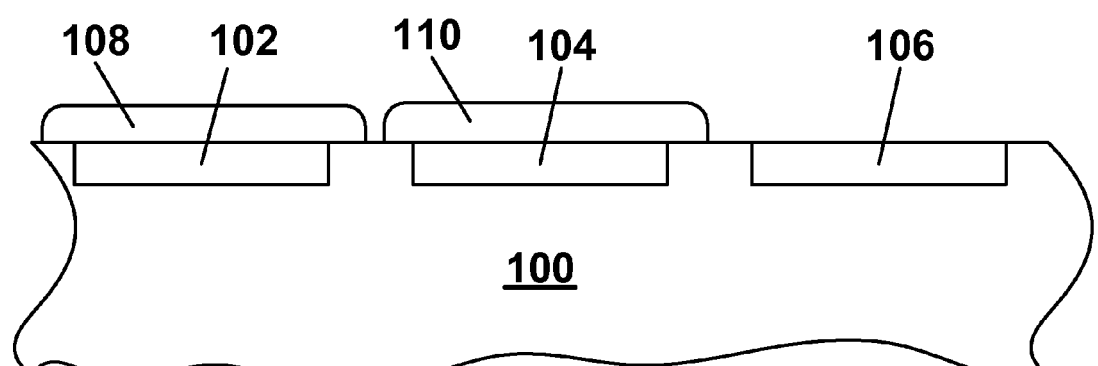
Figure 1D:
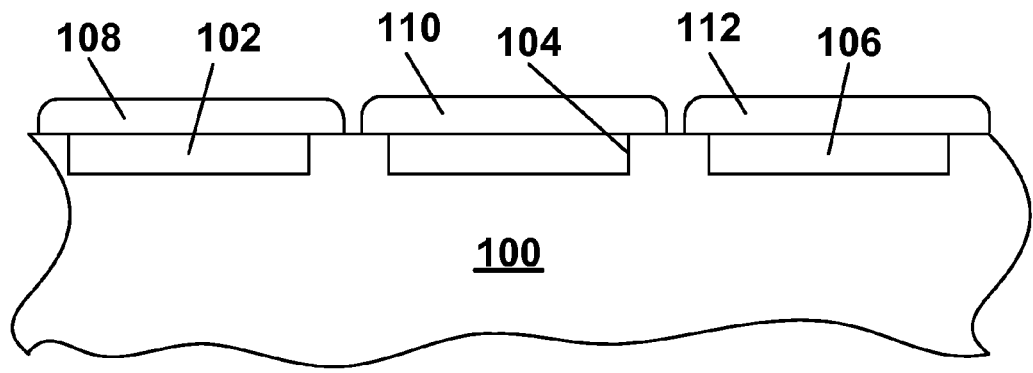
Figure 1E:
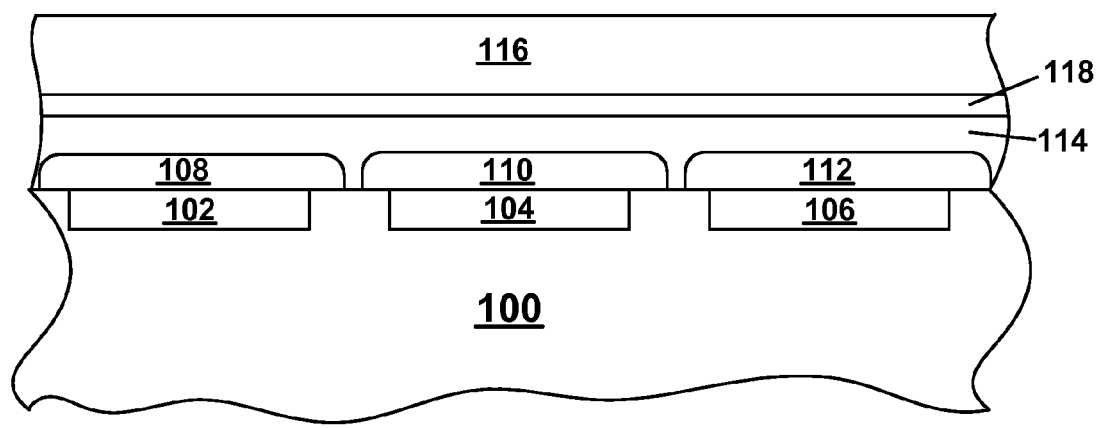

Other aspects of the present invention make use of ink jet printing of multiple types of electro-optic media to produce color displays. One process of this type is illustrated in FIGS. 1A-1E. FIG. 1A illustrates, in a highly schematic matter, a portion of an active matrix backplane (generally designated 100) having three adjacent columns of pixel electrodes 102, 104 and 106, these columns extending perpendicular to the plane of FIG. 1A so that only one pixel electrode in each column is visible in FIG. 1A. (The spacing between the pixel electrodes is exaggerated in FIGS. 1A-1E for ease of illustration.) In a first step of the process, as illustrated in FIG. 1B, a first electro-optic medium 108 is ink jet printed over the pixel electrodes 102; this first electro-optic medium is (for example) a polymer-dispersed electrophoretic medium having white and red extreme optical states. The first electro-optic medium 108 is applied with its continuous phase in a fluid form and is thereafter dried to form a coherent layer of electrophoretic medium adhered to the backplane 100. In the next step of the process, as illustrated in FIG. 1C, a second electro-optic medium 110 is ink jet printed over the pixel electrodes 104; this second electro-optic medium is (for example) a polymer-dispersed electrophoretic medium having white and green extreme optical states. The second electro-optic medium 110 is applied with its continuous phase in a fluid form and is thereafter dried to form a coherent layer of electrophoretic medium adhered to the backplane 100. Similarly, as illustrated in FIG. 1D, a third electro-optic medium 112 is then ink jet printed over the pixel electrodes 106; this third electro-optic medium is (for example) a polymer-dispersed electrophoretic medium having white and blue extreme optical states. The third electro-optic medium 112 is applied with its continuous phase in a fluid form and is thereafter dried to form a coherent layer of electrophoretic medium adhered to the backplane 100.

Separately, an adhesive layer 114 is coated on to a film comprising a polymeric layer 116 (which may, for example, be formed of poly(ethylene terephthalate) (PET)) bearing on one surface a layer 118 of indium-tin-oxide (ITO). The resultant adhesive layer/polymeric film sub-assembly is then laminated to the structure shown in FIG. 1D, with the adhesive layer 114 in contact with the electrophoretic media 108, 110, 112 to produce the final display shown in the FIG. 1E.

It will readily be apparent that numerous variations are possible in the process shown in FIGS. 1A-1E. For example, the adhesive layer 114 could be applied over the cured electrophoretic media 108, 110, 112 and the film 116, 118 laminated to the adhesive present on the backplane. Provided that the electrophoretic media can be printed with gaps between them, or formulated in such a manner that they do not mix, the three electrophoretic media could be printed and cured simultaneously rather than sequentially as described above. In some cases, it may be convenient to print the electrophoretic media 108, 110, 112 on to a release sheet (not shown in the drawings) rather than directly on to the backplane 100, and then to laminate the printed electrophoretic media on to the backplane and remove the release sheet. Printing the electrophoretic media on to a smooth release sheet in this manner provides electrophoretic media with a very smooth surface remote from the backplane and may facilitate lamination of the electrophoretic media to the adhesive layer.

Figure 2A:
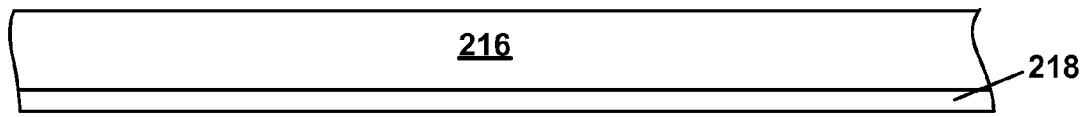
FIGS. 2A to 2E are schematic side elevations showing various stages in the production of a colored front plane laminate of the present invention.
Figure 2B:
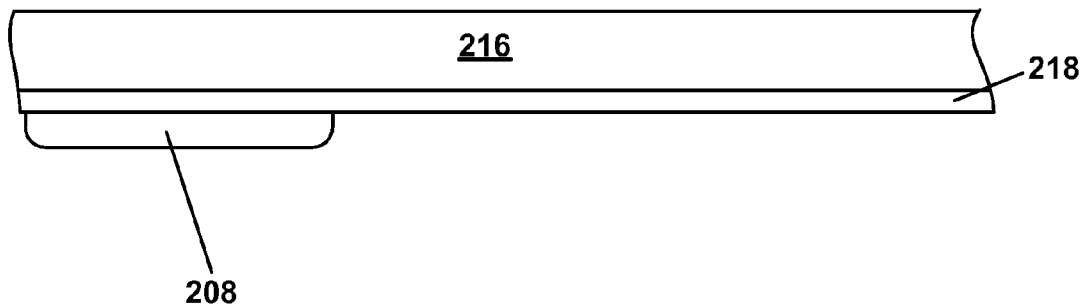
Figure 2C:
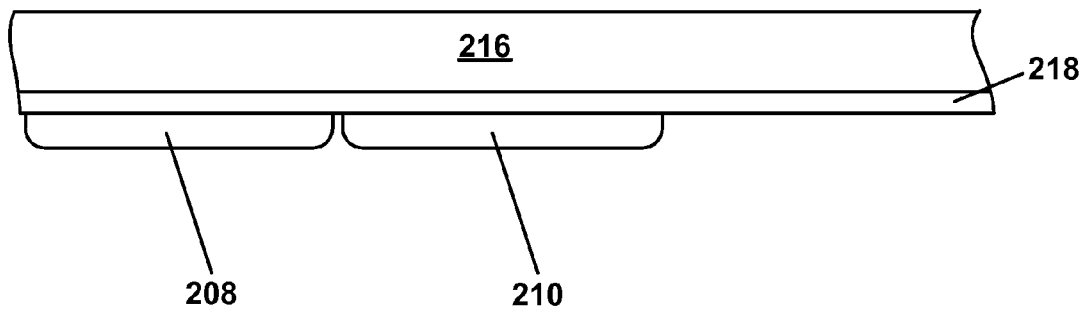
Figure 2D:
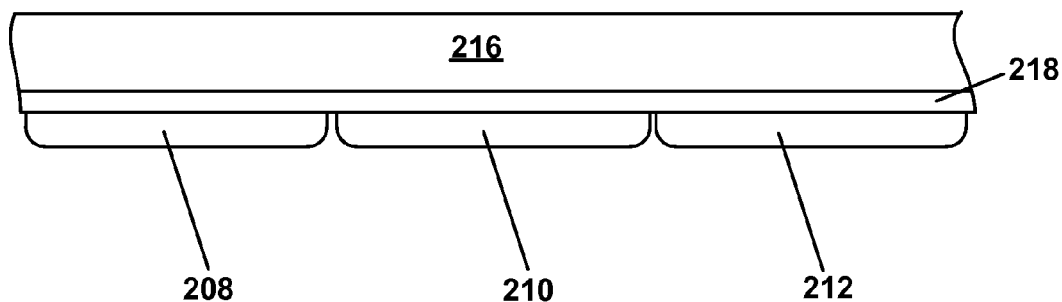
Figure 2E:
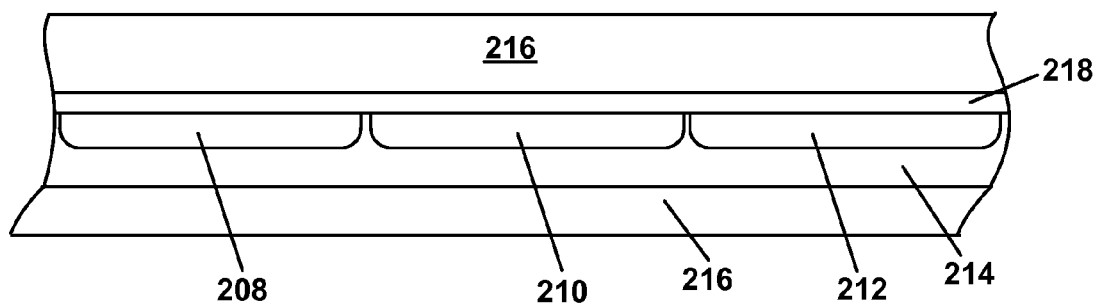

FIGS. 2A-2E illustrate a process of the present invention for production of a colored front plane laminate. The process begins (as shown in FIG. 2A) with a PET film 216 bearing an ITO layer 218. In a first step of the process, as illustrated in FIG. 2B, a first electro-optic medium 208 is ink jet printed in stripes over substantially one-third of the ITO layer 218; this first electro-optic medium is (for example) an encapsulated electrophoretic medium having white and red extreme optical states. The first electro-optic medium 208 is applied with its binder in a fluid form and is thereafter dried to form a coherent layer of electrophoretic medium adhered to the ITO layer 218. In the next step of the process, as illustrated in FIG. 2C, a second electro-optic medium 210 is ink jet printed in stripes adjacent and parallel to the stripes of the first electro-optic medium 208 on to the ITO layer 218; this second electro-optic medium is (for example) an encapsulated electrophoretic medium having white and green extreme optical states. The second electro-optic medium 210 is applied with its binder in a fluid form and is thereafter dried to form a coherent layer of electrophoretic medium adhered to the ITO layer 218. Similarly, as illustrated in FIG. 2D, a third electro-optic medium 212 is then ink jet printed in stripes adjacent and parallel to the stripes of the first and electro-optic media 208 and 210 on to the ITO layer 218; this third electro-optic medium is (for example) an encapsulated electrophoretic medium having white and blue extreme optical states. The third electro-optic medium 212 is applied with its binder in a fluid form and is thereafter dried to form a coherent layer of electrophoretic medium adhered to the ITO layer 218.

Separately, an adhesive layer 214 is coated on to a release film 216. The resultant adhesive layer/polymeric film sub-assembly 214, 216 is then laminated to the structure shown in FIG. 2D, with the adhesive layer 114 is contact with the electrophoretic media 208, 210, 212 to produce the final front plane laminate shown in FIG. 2E.

As already mentioned, a second aspect of the present invention relates to providing a color filter by ink jet printing a plurality of areas of colored material on to a substrate, the plurality of areas including areas of at least two different colors. In such a process, there will typically be areas of at least three, and possibly four, different colors, for example, red/green/blue, red/green/blue/white or yellow/cyan/magenta, in order that the color filter can eventually be used to produce a full color display. White areas, if present, can of course be provided simply by not coating a colored material over the relevant areas of the conductive layer. Conveniently, the various colored areas are in the form of parallel stripes, or, in the case of four color filters, in the form of multiple 2×2 arrays of colored areas.

A wide variety of colored materials may be used in such process. For example, the colored material may be a hard coat material. We do not exclude the possibility that the colored material could serve functions in addition to acting as a color filter; for example, the colored material could serve as an adhesive to improve adhesion of the electro-optic material to the substrate, or might act as a barrier layer to prevent environmental contaminants, such as moisture, or radiation reaching the electro-optic material. Ink jet printing of colored material in accordance with the present invention can provide a totally polymeric color filter array which may be very useful in the construction of flexible or conformal electro-optic displays.

FIGS. 3A-3F illustrate a process for the production of a color double release film or inverted front plane laminate in which a color filter is provided by ink jet printing in accordance with the present invention. Some steps of this process also make use of the "one-layer-at-a-time" construction techniques of the aforementioned U.S. Pat. No. 7,110,164.

Figure 3A:
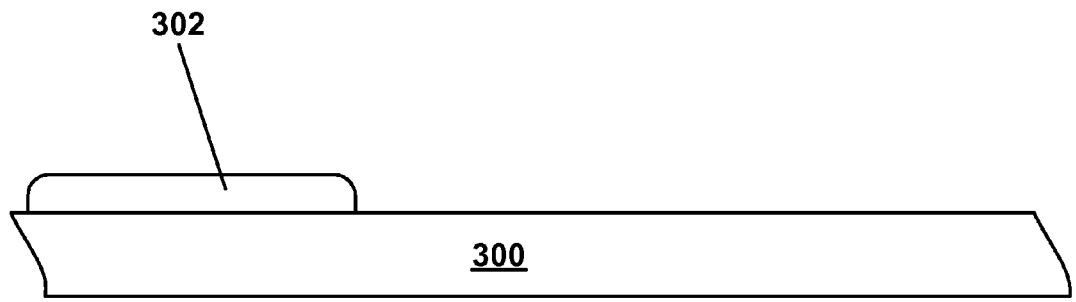
FIGS. 3A to 3F are schematic side elevations showing various stages in the production of a double release film of the present invention.
Figure 3B:
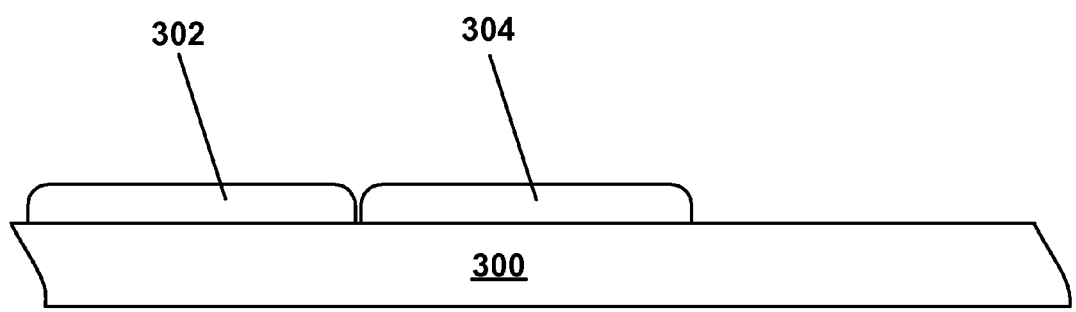
Figure 3C:
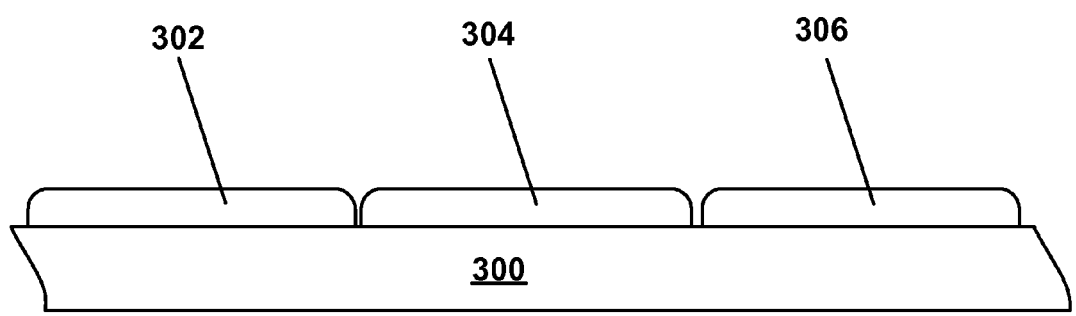
Figure 3D:
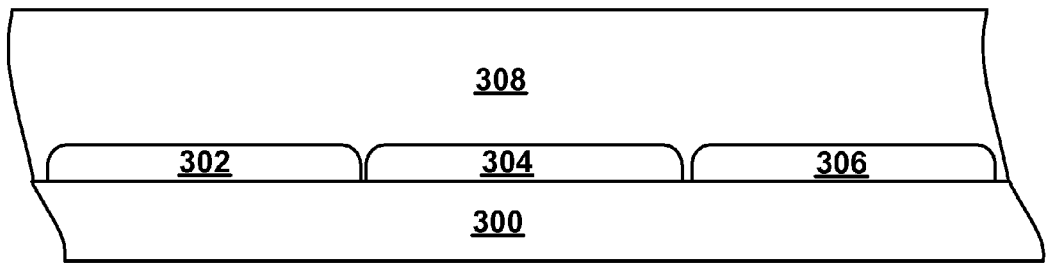
Figure 3E:
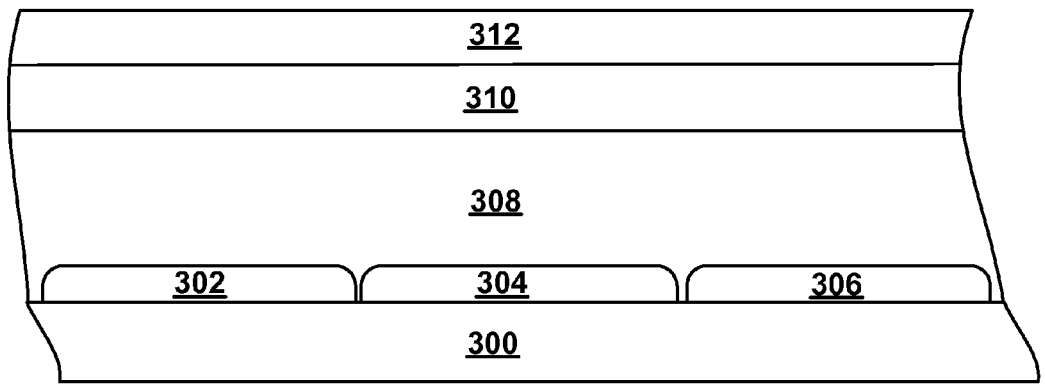
Figure 3F:
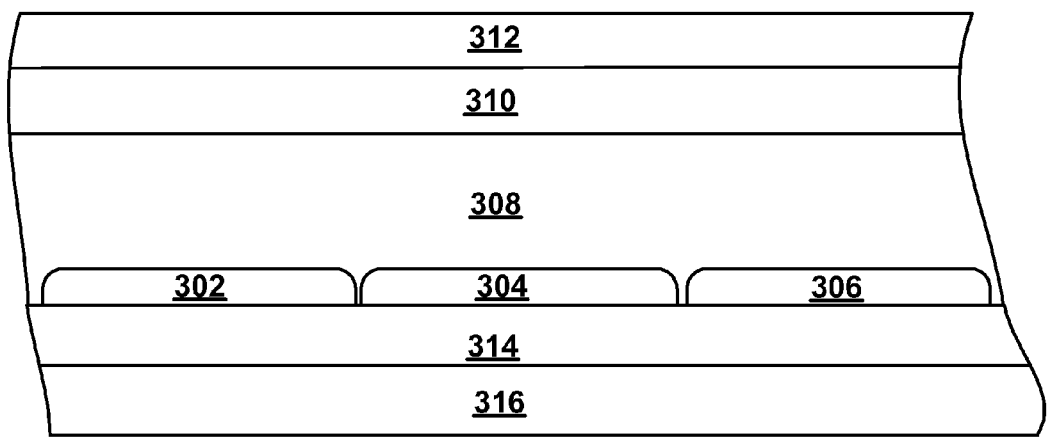

In the first step of this process, as shown in FIG. 3A, a colored material 302, which may be for example a solution of a red dye or nanoparticle pigment in a curable resin, is deposited in the form of spaced stripes on a first release sheet 300. The colored material 302 is then cured to form a coherent layer of the colored material 302 on the release sheet 300. As shown in FIGS. 3B and 3C, the process step is repeated successively with green and blue colored materials 304 and 306 to form an RGB filter layer on the release sheet 300. Next, as shown in FIG. 3D, a layer of electro-optic material 308 is then deposited over the colored materials 302, 304, 306; this layer of electro-optic material 308 may be, for example, a layer of a polymer-dispersed electrophoretic material deposited by ink jet printed, or a layer of encapsulated electrophoretic material deposited by slot coating or other means. Typically, after deposition it is necessary to dry or otherwise cure the electro-optic material 308 to form this material into a coherent layer.

Separately, a thin layer of lamination adhesive 310 is deposited on a second release sheet 312 and dried. The dried lamination adhesive 310 is then laminated, typically under heat and pressure, to the exposed surface of the electro-optic material 308, to form the structure shown in FIG. 3E, which is itself a double release film as described in the aforementioned 2004/0155857.

In the final step of the process, a thick layer of lamination adhesive 314 is deposited on a third release sheet 316 and dried. The first release sheet 300 is removed from the structure of FIG. 3E (as will readily be apparent to those skilled in the use of release sheets, it is necessary to choose the first and second release sheet carefully to ensure that the removal of the first release sheet 300 from the structure of FIG. 3E can be achieved without damaging the underlying color filter layer and without disturbing the second release sheet 312), and the dried lamination adhesive 314 is then laminated, typically under heat and pressure, to the exposed surface of the color filter layer 302, 304, 306, to form the structure shown in FIG. 3F, which is an inverted front plane laminate as described above.

Finally, as already noted, another aspect of the present invention relates to ink jet printing of electrodes and/or conductors on to a layer of electro-optic material. Suitable materials for ink jet printing of electrodes and conductors are available commercially, for example printing ink AG-II-G-100 S1, sold by Cabot Corporation of Billerica, Mass. Printing of electrodes and conductors directly on to a layer of electro-optic material in accordance with the present invention may be used to form a modified front plane laminate, inverted front plane laminate or double release film with electrodes and conductors already in place, such that the front plane laminate etc. can be laminated directed to a "backplane" provided with a minimal number of contact pads which contact conductors provided on the front plane laminate. Furthermore, the use of such a modified front plane laminate may enable a single standardized backplane with a standard arrangement of contact pads (for example, a row of contact pads along one edge of the backplane) to be used with a large number of different modified front plane laminates.

Two potential problems with printing conductors directly on to electro-optic material are that the shapes of the conductors will be visible on the final image (since the conductors are at the same voltage as their associated electrodes, the conductors will also switch the electro-optic material) and that, with some arrangements of electrodes, it may be difficult to arrange for conductors to reach a desired location, for example a contact pad at the edge of the display, without crossing other conductors or electrodes. Both these problems may be reduced or overcome by ink jet (or otherwise) printing a layer of a dielectric material between the electro-optic material and the conductors, or between intersecting conductors and intersecting conductors and electrodes. In the case where two conductors need to cross, it may be desirable to use two separate dielectric layers, thus producing an electro-optic material/dielectric/conductor/dielectric/conductor structure.

Numerous changes and modifications can be made in the preferred embodiments of the present invention already described without departing from the scope of the invention. Accordingly, the foregoing description is to be construed in an illustrative and not in a limitative sense.

The invention claimed is:

1. A process for forming a front plane laminate having a color filter, which process comprises:
   providing a light-transmissive, electrically-conductive layer;
   ink jet printing a plurality of areas of colored material on to the light-transmissive, electrically-conductive layer, the plurality of areas including areas of at least two different colors;
   applying a layer of an electro-optic material over the colored material;
   applying a layer of a lamination adhesive over the layer of electro-optic material; and
   applying a release sheet over the layer of lamination adhesive.

2. A process according to claim 1 wherein the colored material is ink jet printed in a fluid form, and is thereafter subjected to conditions effective to convert the fluid form to a solid form, thereby forming a coherent layer of the colored material on the light-transmissive, electrically-conductive layer.

3. A process according to claim 2 wherein a first colored material is ink jet printed in a fluid form, and is thereafter subjected to conditions effective to convert the fluid form to a solid form, thereby forming a coherent layer of the first colored material, and thereafter a second colored material is ink jet printed on the light-transmissive, electrically-conductive layer.

4. A process according to claim 1 further comprising ink jet printing at least one fiducial mark on the light-transmissive, electrically-conductive layer at least one predetermined location relative to at least one area of colored material.

5. A process for forming a color double release film, which process comprises:
   (a) providing a first release sheet;
   (b) applying a first layer of a lamination adhesive to the release sheet;
   (c) ink jet printing a plurality of areas of colored material, the plurality of areas of colored material including areas of at least two different colors;
   (d) forming a layer of electro-optic material; and
   (e) providing a second layer of a lamination adhesive and a second release sheet over the layer of electro-optic material,
   wherein steps (c) and (d) are performed in either order, and wherein step (e) is effected by forming the second layer of lamination adhesive on the second release sheet and thereafter laminating the second layer of lamination adhesive and the second release sheet to the remaining layers of the double release film.

6. A process for producing a laminate for use in the production of an electro-optic display, the process comprising:
   (a) providing a first release sheet;
   (b) ink jet printing a plurality of areas of colored material on to the first release sheet, the plurality of areas including areas of at least two different colors, thereby forming a first sub-assembly;
   (c) providing a second release sheet;
   (d) forming a layer of electro-optic material on the second release sheet, thereby forming a second sub-assembly; and
   (e) laminating the first and second sub-assemblies together with the areas of colored material in contact with the layer of electro-optic material to form the laminate.

7. A process according to claim 6 further comprising forming a layer of a lamination adhesive on a third release sheet, removing one of the first and second release sheets from the laminate produced in step (e), and contacting the layer of lamination adhesive with one of the plurality of areas of colored material and the layer of electro-optic material exposed by removal of the release sheet.

8. A process for forming a color double release film, which process comprises:
   (a) providing a first release sheet;
   (b) applying a first layer of a lamination adhesive to the release sheet;
   (c) ink jet printing a plurality of areas of colored material on the lamination adhesive, the plurality of areas of colored material including areas of at least two different colors;

(d) forming a layer of electro-optic material; and (e) providing a second layer of a lamination adhesive and a second release sheet over the layer of electro-optic material.

9. A process according to claim 6 wherein at least one of the plurality of areas of colored material is ink jet printed in a fluid form, and is thereafter subjected to conditions effective to convert the fluid form to a solid form, thereby forming a coherent area of the colored material on the first release sheet.

10. A process according to claim 9 wherein a first colored material is ink jet printed in a fluid form, and is thereafter subjected to conditions effective to convert the fluid form to a solid form, thereby forming a coherent area of the first colored material, and thereafter a second colored material is ink jet printed on the first release sheet.

11. A process according to claim 6 further comprising ink jet printing at least one fiducial mark on the first release sheet at least one predetermined location relative to at least one area of colored material.

* * * * *